United States Patent [19]

Mitsuhashi

[11] Patent Number: 5,223,992
[45] Date of Patent: Jun. 29, 1993

[54] ROTARY MAGNETIC HEAD DEVICE IN MAGNETIC RECORDING AND REPRODUCING APPARATUS

[75] Inventor: Yasuo Mitsuhashi, Nagaokakyo, Japan

[73] Assignee: Mitsubishi Denki Kabushiki Kaisha, Tokyo, Japan

[21] Appl. No.: 592,955

[22] Filed: Oct. 4, 1990

[30] Foreign Application Priority Data

Nov. 10, 1989 [JP] Japan .................. 1-293383
Mar. 23, 1990 [JP] Japan .................. 2-75104

[51] Int. Cl.$^5$ .................. G11B 21/02; G11B 21/24
[52] U.S. Cl. .................. 360/75; 360/77.16; 360/109
[58] Field of Search .............. 360/75, 70, 77.16, 107, 360/109, 108

[56] References Cited

U.S. PATENT DOCUMENTS

| | | | |
|---|---|---|---|
| 3,499,998 | 3/1970 | Tanigawa et al. | 360/130.2 |
| 4,104,684 | 8/1978 | Wakami et al. | |
| 4,127,881 | 11/1978 | Wakami et al. | |
| 4,151,569 | 4/1979 | Hathaway | 360/107 |
| 4,212,043 | 7/1980 | Baker | 360/109 |
| 4,568,986 | 2/1986 | Furuhata et al. | |
| 4,581,658 | 4/1986 | Azuma et al. | |
| 4,882,635 | 11/1989 | Sanai | 360/77.16 |
| 4,985,794 | 1/1991 | Rato et al. | 360/107 |
| 5,101,309 | 3/1992 | Mitsuhashi | 360/109 |
| 5,103,361 | 4/1992 | Nagatsuka et al. | 360/109 |

FOREIGN PATENT DOCUMENTS 63-67253 12/1988 Japan .

Primary Examiner—Aristotelis Psitos
Assistant Examiner—Varsha V. Sheladin

[57] ABSTRACT

A rotary magnetic head device in a magnetic recording and reproducing apparatus such as a VTR apparatus and a DAT apparatus which adopts a helical scanning system. In order to prevent the demagnetization of a magnetic tape and reduce a jitter component of a reproducing signal, a head unit moves the magnetic head in the diametrical direction of a rotary drum. The head unit has a bobbin inserted into the center holes of a plurality of spring leaves, and the bobbin is moved in the diametrical direction of the rotary drum by the electromagnetic force produced on the coil wound around the bobbin. A head arm attached to the spring leaf is thereby moved in the same direction, thereby varying the amount of projection of the magnetic head. The amount of projection of the magnetic head is controlled in correspondence with the level of the envelope of a reproducing signal so as to be set at the minimum value in the range in which the output level of the envelope signal is saturated.

18 Claims, 12 Drawing Sheets

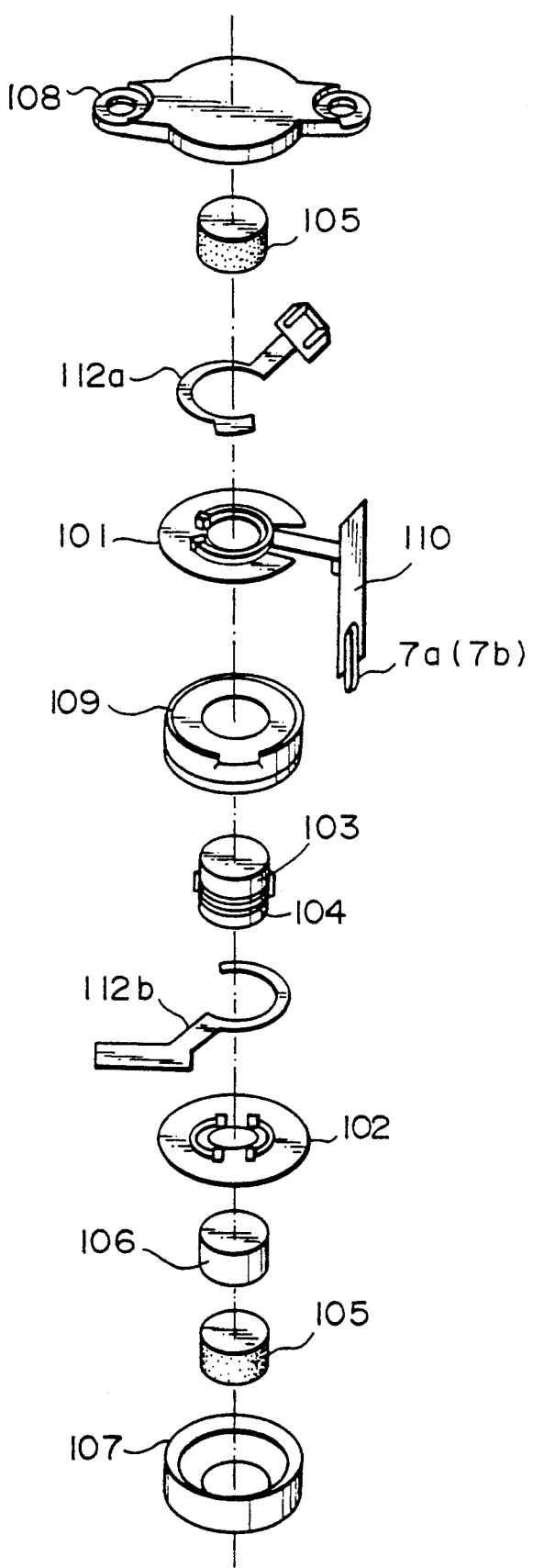

ROTARY MAGNETIC HEAD DEVICE IN MAGNETIC RECORDING AND REPRODUCING APPARATUS

BACKGROUND OF THE INVENTION

1. Field of the Invention

The present invention relates to a rotary magnetic head device in a magnetic recording and reproducing apparatus and, more particularly, to a rotary magnetic head device which is capable of controlling the amount of projection of the rotary magnetic head in a magnetic recording and reproducing apparatus such as a VTR apparatus and a DAT apparatus which adopts a helical scanning system.

2. Description of the Related Art

A conventional rotary magnetic head device in a magnetic recording and reproducing apparatus such as a VTR apparatus and a DAT apparatus which adopts a helical scanning system has the structure shown in FIG. 7.

FIG. 7 is a sectional view of a conventional rotary magnetic head device in a magnetic recording and reproducing apparatus. A conventional rotary magnetic head device is composed of a fixed lower drum 1, a rotary shaft 3 which pierces the lower drum 1 at the center thereof and rotatably supported by the lower drum 1 through upper and lower bearings 2, a seat 4 fixed at the upper end of the rotary shaft 1 which projects from the lower drum 1, and an upper drum screwed to the seat 4. A head rest 6 is removably screwed to a predetermined position of the undersurface of the upper drum 5, namely, the surface facing the lower drum 1. To the head rest 6, a magnetic head 7 is fixed in such a manner as to slightly protrude from the outer peripheries of the upper and lower drums 5 at a small gap therebetween. In FIG. 7, the reference numeral 8 represents an upper transformer attached to the seat 4, 9 a lower transformer fixed to the lower drum 1 in such a manner as to be opposed to the upper transformer 8 with a small gap therebetween, 10 and 11 connecting portions, 12 a distribution board and 13 a magnetic tape.

In the conventional rotary magnetic head device having the above-described structure, the upper drum 5 is rotated at a high speed with a constant number of revolutions. The magnetic tape 13 is slightly obliquely wound around the outer peripheral surfaces of the upper and lower drums 5 and 1, and travels at a predetermined speed. The magnetic head 7 comes into contact with the magnetic tape 13 and records or reproduces a video (or sound) signal. The magnetic head 7 is electrically connected to the upper transformer 8 through the connecting portions 10, 11 and the distribution board 12. The upper and lower transformers 8, 9 are magnetically coupled to each other so as to transmit a signal to each other. The lower transformer 9 is connected to an external signal processor (not shown).

With the travel of the magnetic tape 13 and the rotation of the magnetic head 7, the magnetic head 7 consecutively crosses the magnetic tape 13 obliquely. The trajectories of the magnetic head 7 which crosses the magnetic tape 13 are parallel to each other. This will be explained in more detail with reference to FIGS. 8A and 8B. The reference numeral 13a represents a trajectory of the magnetic tape 13, the symbol $V_1$ the ordinary magnetic tape feeding speed, the reference numeral 7A the trajectory of the magnetic head 7 and the symbol $V_0$ the rotating speed of the magnetic head 7. The trajectories 13a and 7A cross each other, as shown in FIG. 8A. Thus, the relative trajectory of the magnetic head 7 which actually comes into sliding contact with the travelling magnetic tape 13 is the one indicated by A in FIG. 8A.

Since the two magnetic heads consecutively come into sliding contact with the magnetic tape 13, if the trajectory of one magnetic head which comes into sliding contact with the magnetic tape is represented by A and the trajectory of the other magnetic head which comes into sliding contact with the magnetic tape is represented by B, the trajectories A and B are formed on the magnetic tape 13 in parallel with each other and at a high density, as indicated by $A_1$, $B_1$, $A_2$, $B_2$ .... These $A_1$, $B_1$, $A_2$, $B_2$... are what is called tracks on the tape. In the magnetic tape 13, at the time of still reproduction (still operation) and recording stop and standby (pause operation), the travel of the magnetic tape 13 is stopped while the upper drum 5, namely, the rotary drum is rotating at a high speed, so that each magnetic head 7 continuously traces the trajectory 7A shown in FIG. 8A. In other words, the magnetic head 7 continues tracing a position of the magnetic tape 13 at an angle smaller than the ordinary angle of inclination. In this way, the rotary magnetic head device of, for example, a conventional magnetic video recording and reproducing apparatus (VTR) carries out an ordinary reproducing operation (the magnetic tape 13 travels at a predetermined feeding speed), a still reproducing operation (the magnetic tape 13 stops) and a recording stopping and standby operation (the magnetic tape 13 stops).

In 1-inch helical VTRs used for broadcasting, a technique of automatically tracking at the time of reproduction while moving the magnetic head in the direction of the width of the magnetic tape such as what is called automatic scan tracking (AST) or dynamic track following (DTF) has conventionally been developed.

This technique will be explained in the following with reference to FIGS. 9 to 12. In FIGS. 9 to 12, the reference numeral 7 represents the magnetic head for recording and reproduction, 14 a head exclusively for special reproduction which is operated at the time of AST or DTF, 15 a bimorph piezoelectric element to the end of which the head 14 exclusively for special reproduction is attached, and 5 the rotary drum which rotates at 1,800 rpm and to which the magnetic heads 7 for recording and reproduction and the bimorph piezoelectric elements 15 are attached FIG. 10 shows the structure of the actuator portion of the DTF system, wherein the reference numeral 1 represents the fixed drum and 13 the magnetic tape.

FIG. 11 shows the principle of the operation of the bimorph piezoelectric element 15 which is conventionally used. The bimorph piezoelectric element 15 is a bimorph plate composed of two piezoelectric elements $X_1$, $X_2$ sandwiched between electrodes $Y_1$ and $Y_2$, and between electrodes $Y_2$ and $Y_3$, respectively. To the free end of the bimorph piezoelectric element 15 is attached the head 14 exclusively for special reproduction, and a power source S is connected to the three electrodes $Y_1$ to $Y_3$. For example, when the power source S applies a forward voltage to the piezoelectric element $X_1$ and a reverse voltage to the piezoelectric element $X_2$, the piezoelectric element $X_1$ contracts in the direction indicated by the arrow $x_1$ while the piezoelectric element $X_2$ extends in the direction indicated by the arrow $x_2$.

On the other hand, when the power source S applies a reverse voltage to the piezoelectric element $X_1$ and a forward voltage to the piezoelectric element $X_2$, the piezoelectric element $X_1$ extends while the piezoelectric element $X_2$ contracts. In this way, the bimorph piezoelectric element 15 vertically moves in the axial direction of the drums 1 and 5, as shown in FIG. 10.

The principle of noiseless high-speed search at the time of high-speed reproduction will now be explained with reference to FIG. 12. The symbols $A_1$, $B_1$, $A_2$, $B_2$, $A_3$, $B_3$, . . . denote the video tracks recorded on the magnetic tape 13. The azimuth at which the tracks $A_1$, $A_2$, $A_3$, . . . are recorded by the head is different from the azimuth at which the tracks $B_1$, $B_2$, $B_3$, . . . are recorded.

It is now assumed that signals are reproduced at a quintuple speed for high-speed search. Unless the bimorph piezoelectric element 15 for the head 14 exclusively for special reproduction is driven, the trajectory of the head 14 exclusively for special reproduction which scans the magnetic tape 13 is the one represented by the broken line $L_1$ in FIG. 12. If the azimuth of head 14 exclusively for special reproduction is the same as that of the track A, the signal is reproduced only by scanning the tracks $A_1$, $A_2$, $A_3$, . . . , and the tracks $B_1$, $B_2$, $B_3$ which are recorded at a different azimuth must be scanned separately therefrom, so that a noise bar is produced on a reproducing screen. In order to completely reproduce the track $A_1$ even when the video tape travels at a quintuple speed, the head 14 exclusively for special reproduction is moved in the axial direction of the track (left-hand side in FIG. 12) by 4 track pitches in one field during which the head 14 exclusively for special reproduction comes into contact with the magnetic tape 13. In the next field, the opposite head 14 exclusively for special reproduction is moved by 4 track pitches. In this way, the tracks $A_1$, $B_3$, $A_6$, . . . are completely scanned, thereby obtaining noiseless reproducing signals. In other words, the noiseless reproduction at any speed is realized by moving the rotary magnetic head in the direction of the width of the track in accordance with the tape speed at the time of reproduction, as described above. That is, the movable head in the conventional device explained above is a head which is movable in the axial direction of the drum.

As described above, a movable head has been developed as a new technique for a VTR and has already been used in some VTR's for business use, but the magnetic head provided on the rotary drum in a household VTR is still a fixed head.

In a conventional rotary magnetic head device, during still reproduction and recording stop and standby, since the magnetic tape 13 is stopped, the magnetic head 7 repeatedly slides on one track (more accurately, the magnetic head 7 slides on the track portion bestriding two tracks because the trajectory of the head has a smaller angle of inclination during the stop of the magnetic tape 13 than the ordinary angle of inclination of the track, as described above) of the magnetic tape 13 at a high speed, as shown in FIG. 8A. The magnetic surface of the magnetic tape 13 is damaged thereby and the magnetization of the magnetic material is gradually reduced (this phenomenon is called demagnetization). To prevent this, in a conventional VTR apparatus, when still reproduction or recording stop and standby continues for, generally, 4 to 5 minutes, the loading of the magnetic tape on the drum is automatically released and the VTR apparatus is stopped. Once the stopping mode is taken, several seconds is required for starting the next operation. In this way, handling of the VTR apparatus during still reproduction or recording stop and standby is very troublesome.

In a VTR of an AST or DTF system, a movable head is adopted as a magnetic head and the vertical movement of the magnetic head in the axial direction of the drum is controlled.

In either case, the magnetic head slightly projects from the outer periphery of the drum and slides on the magnetic surface of the magnetic tape which is wound around the drum, as shown in FIG. 9. Such a magnetic head wears by, for example, 8 to 10 $\mu$m in 1,000 hours. Although it is desirable that the amount of projection from the outer periphery of the drum is the same, the amount of projection is apt to become nonuniform due to the wear caused by the sliding on the magnetic tape, and a jitter is disadvantageously produced on the reproduced picture. When the amount of projection from the drum is reduced due to the wear of the magnetic head, the state in which the magnetic head is in contact with the magnetic tape is deteriorated, thereby making it impossible to maintain good picture quality for a long time and, in the worst case, making it necessary to replace the head in spite of short-time use.

SUMMARY OF THE INVENTION

Accordingly, it is an object of the present invention to eliminate the above-described problems in the related art and to provide a rotary magnetic head device for a magnetic recording and reproducing apparatus which is capable of maintaining a still reproduction mode and a recording stop and standby mode for a long time, in other words, which does not produce demagnetization.

It is another object of the present invention to provide a rotary magnetic head device for a magnetic recording and reproducing apparatus which is capable of reducing a jitter component of a reproducing signal and maintaining a high picture quality for a long time.

To achieve this aim, a rotary magnetic head device for a magnetic recording and reproducing apparatus according to the present invention comprises: a rotary drum; a magnetic head projecting in the diametrical direction of the rotary drum; and a head unit for varying the amount of projection of the magnetic head from the rotary drum by moving the magnetic head in the diametrical direction of the rotary drum.

The head unit includes: a plurality of spring leaves each having a center hole and arranged in parallel to each other with the peripheral portions thereof fixed to yokes; a bobbin inserted into the center holes of the plurality of spring leaves so as to be supported thereby in such a manner as to be floatable in the diametrical direction of the rotary drum; a pole piece inserted into the bobbin; permanent magnets disposed at both ends of the pole piece within the bobbin; a driving coil wound around the bobbin for moving the bobbin in the diametrical direction of the rotary drum by the electromagnetic force produced when energized; and a head arm attached to one of the spring leaves which is extended in the diametrical direction of the rotary drum so as to move in the diametrical direction of the rotary drum with the movement of the bobbin, thereby moving the magnetic head attached to the end of the head arm in the diametrical direction of the rotary drum.

In this way, by moving the magnetic head in the diametrical direction of the rotary drum, it is possible to greatly reduce the amount of projection of the magnetic head in the still reproduction mode or recording stop and standby mode in comparison with that during the ordinary operation and to prevent the demagnetization of the magnetic material.

If the rotary magnetic head device further comprises: an envelope detecting means for detecting the envelope of a reproducing signal from the magnetic head; a searching means for obtaining the minimum amount of projection in the projection range in which the envelope level is saturated by sequentially driving the head unit; and a control means for so controlling the head unit as to fix the magnetic head at the position in conformity with the minimum amount of projection obtained by the searching means, it is possible to control the amount of projection of the magnetic head in correspondence with the envelope level of a reproducing signal, thereby compensating the wear of the magnetic head and maintaining the contact pressure between the magnetic tape and the magnetic head at the optimum value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become clear from the following description of the preferred embodiments thereof, taken in conjunction with the accompanying drawings which are given by way of illustration only, and thus are not limitative of the present invention, and wherein:

FIG. 3 is an exploded perspective view of the head unit shown in FIG. 2;

DESCRIPTION OF THE PREFERRED EMBODIMENTS

An embodiment of the present invention will be explained in detail with reference to the accompanying drawings.

Figure 1:
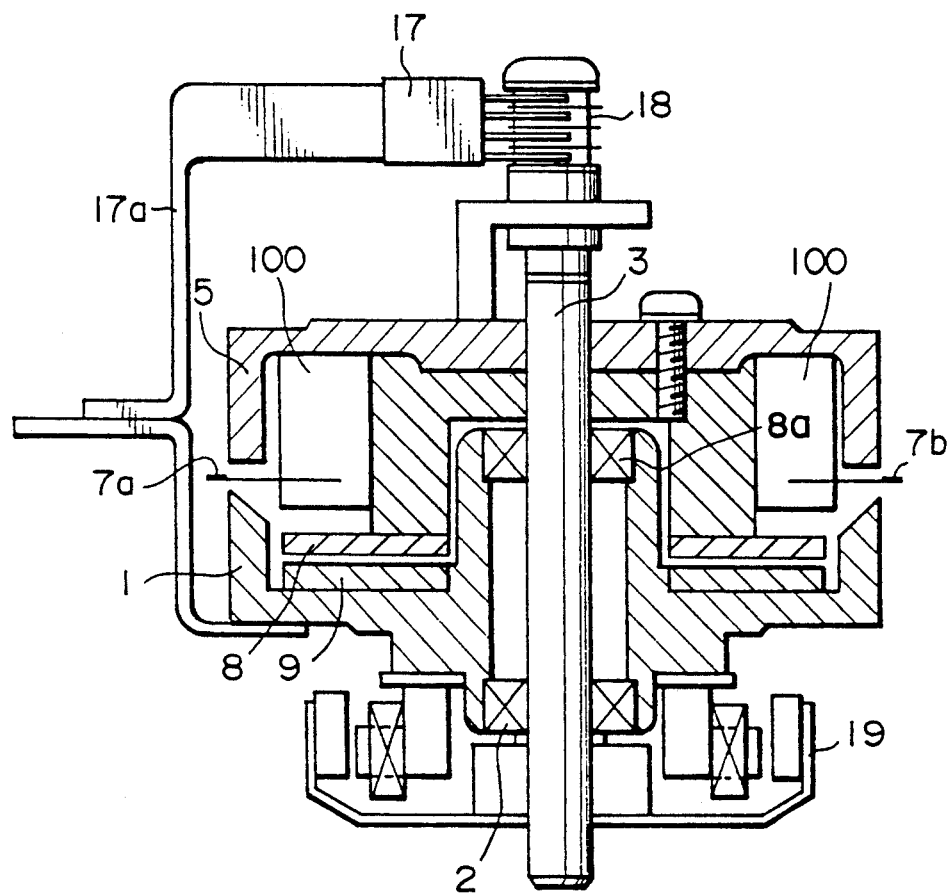
FIG. 1 is a sectional view of an embodiment of a rotary magnetic head device for a magnetic recording and reproducing apparatus according to the present invention.

FIG. 1 is a schematic sectional view of the structure of the drum portion of a rotary magnetic head device according to the present invention. In FIG. 1, the reference numeral 5 represents a rotary drum, 1 a fixed drum situated below the rotary drum 5, 3 a main shaft provided on the central axis of both drums 1, 5, rotatably supported by the fixed drum 1 through bearings 2 and fixed to the rotary drum 5. The reference numeral 17 represents an electrode brush supported by the fixed drum 1 through an arm 17a so as to apply a current to the coil in a later-described head unit 100. The reference numeral 18 represents a slip ring provided on the upwardly extended portion of the main shaft 3 in contact with the electrode brush 17, 19 a drum motor rotating around the main shaft 3, and 8 and 9 rotary transformers fixed to the rotary drum 5 at the upper portion and to the fixed drum 1 at the lower portion.

The head unit 100 is fixed on the inner surface of the rotary drum 5 and rotates at a constant speed of 1,800 rpm by the rotation of the drum motor 19 so as to keep the amount of projection of a magnetic head 7a (7b) from the outer peripheral surface of the drum which is composed of the rotary drum 5 and the fixed drum 1 constant.

Figure 2:
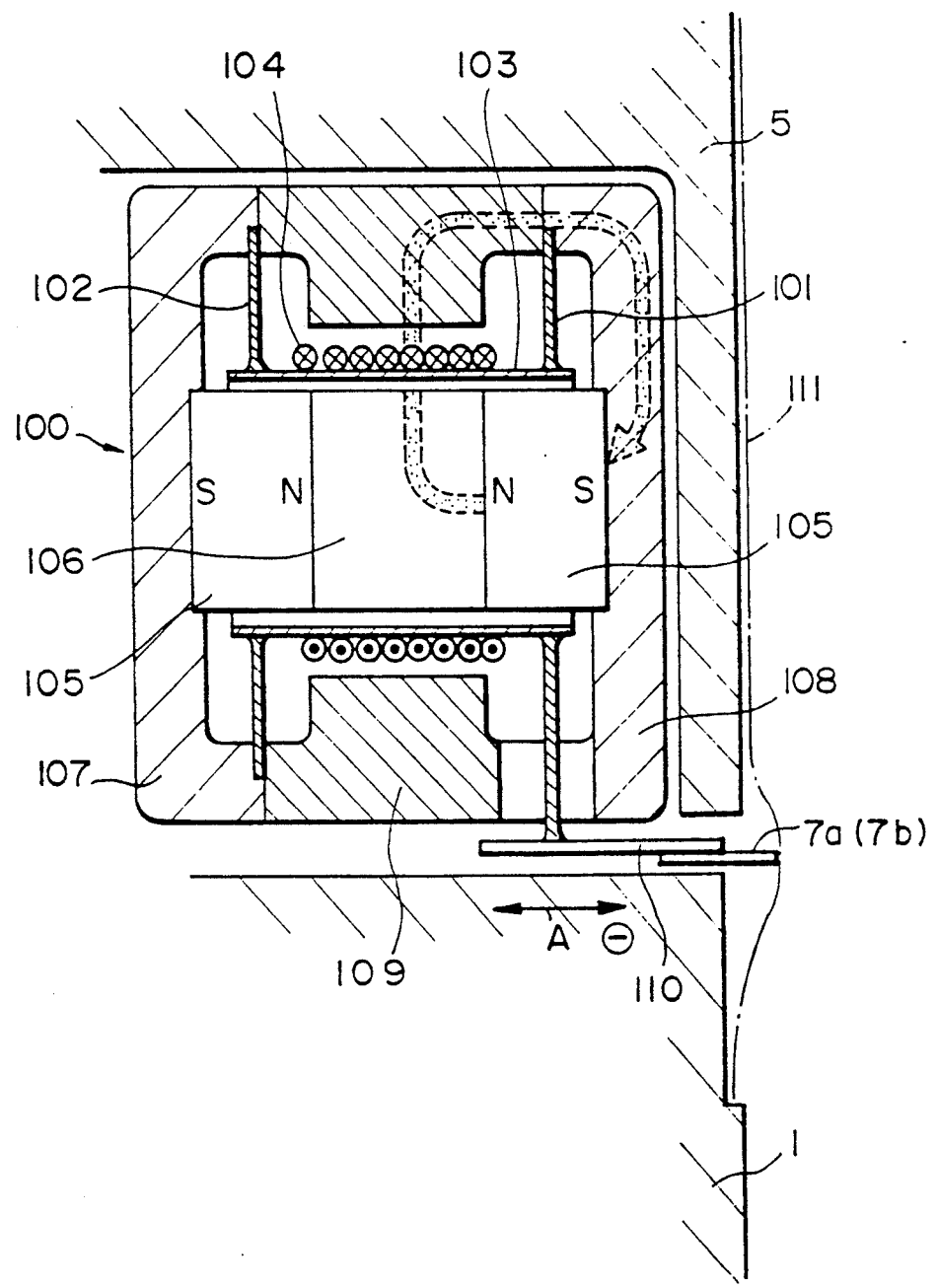
FIG. 2 is a sectional view of a head unit in the embodiment shown in FIG. 1.

FIG. 2 is a sectional view of the head unit 100. The reference numerals 101 and 102 represent circular spring leaves arranged in parallel to each other. To one end of one 101 of the circular spring leaves, the magnetic head 7a (7b) is fixed through a head arm 110. A light-weight bobbin 103 is adhered to the central portions of the circular spring leaves 101, 102. A coil 104 is provided which is composed of, for example, a fine copper wire (diameter: 0.1 mm) wound around the light-weight bobbin 103 in 250 turns with the axis directed to the diametrical or radial direction of the rotary drum 5.

The reference numeral 105 denotes a permanent magnet composed of rare earth element cobalt, 106 a pole piece composed of soft iron, and 107 to 109 yokes composed of soft iron. The pole piece 106 is inserted into the hollow portion of the bobbin 103, and the permanent magnets 105 are secured to both sides of the pole piece 106 through the hollow portion of the bobbin 103. The yokes 107, 108 are connected to both sides of the yoke 109 provided on the outer periphery of the coil 104 and are secured to the end portions of the pair of permanent magnets 105 which are fixed on both sides of the pole piece 106. The reference numeral 111 represents a magnetic tape obliquely wound around the peripheral surfaces of the rotary drum 5 and the fixed drum 1 in contact with the magnetic head 7a (7b).

FIG. 3 is an exploded view of the respective parts of the head unit 100 shown in FIG. 2. The same numerals are provided for the elements which are the same as those shown in FIG. 2. The reference numeral 112a denotes a flexible printed circuit board for receiving and transmitting a head signal, and 112b a flexible printed circuit board for supplying a coil driving current.

Figure 4A:
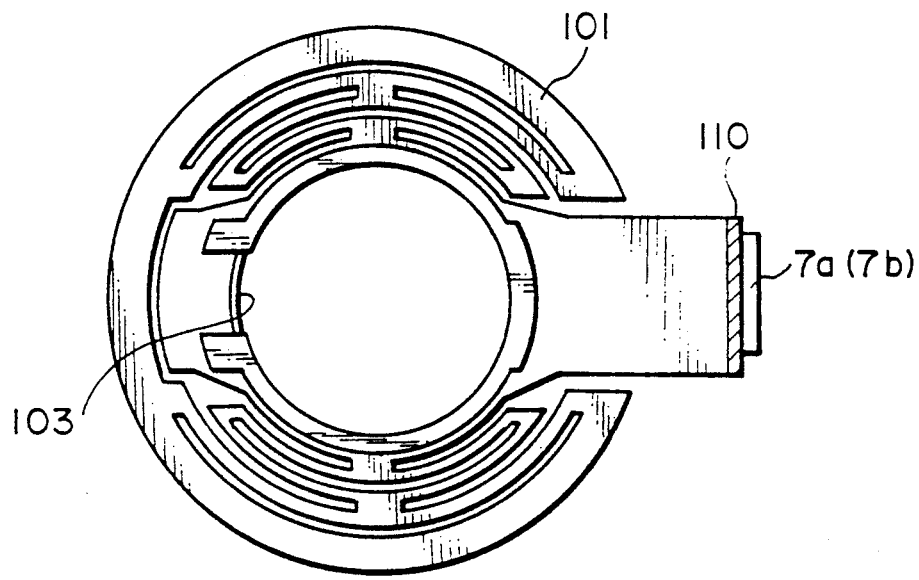
FIGS. 4A and 4B are plan views of two circular spring leaves which support a bobbin constituting the head unit.
Figure 4B:
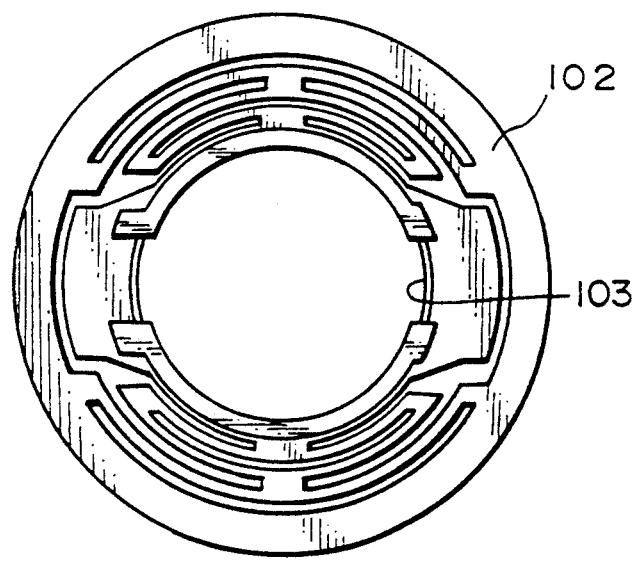

FIGS. 4A and 4B are detailed views of the circuit spring leaves 101 and 102, respectively, which are the main parts of this embodiment. Each of the circular spring leaves 101, 102 is composed of a beryllium copper sheet of 0.8 mm thick provided with a multiplicity of arcuate slits so as to impart a stable elasticity, as shown in FIGS. 4A and 4B. A small molded product of Noryl is inserted into and adhered to the central portion of the circular spring leaf 101 (102) and the bobbin 103 provided with the coil 104 is inserted into and adhered to the molded product. A part of the outer periphery of the circular spring leaf 101 is extended in the form of a long piece provided with a notch and the plate-like head arm 110 is secured thereto in such a manner as to be orthogonal thereto. To the end of the head arm 110 is fixed the magnetic head 7a (7b).

The unit composed of the light-weight bobbin 103 with a fine copper wire wound therearound and the two circular leaves 101, 102 shown in FIGS. 4A and 4B and adhered to two portions of the outer periphery of the light-weight bobbin 103, as described above, is secured to the inner surface of the yokes 107 and 108 by adhesion or fitting, as shown in FIG. 2. When the bobbin 103 as a whole is moved with the peripheries of the circular spring leaves 101, 102 fixed thereto, the magnetic head 7a (7b) also moves in the direction indicated by the arrow A in FIG. 2 (in the diametrical direction of the drum).

The operation will be explained in more detail with reference to FIGS. 1 and 2. If the N-pole side of the permanent magnet 105 is secured to the pole piece 106, a magnetic field is generated, as typically indicated by the arrow of a thick broken line in FIG. 2. When a current is caused to flow on the coil 104 in the direction shown in FIG. 2, the force is applied to the (−) side in the direction indicated by the arrow A according to the Fleming's left-hand rule, whereby the bobbin 103 moves to the right-hand side, namely, in the direction in which the magnetic head 7a (7b) projects from the drum. Since the circular spring leaves 101, 102, which are fixed to the yokes 108 and 107, respectively, at the outer peripheries, have a uniform high elasticity, the bobbin 103 as a whole moves to the (−) side in the direction indicated by the arrow A in proportion to the magnitude of the current. With the movement of the bobbin 103, the head arm 110 and the magnetic head 7a (7b) attached to the long piece of the circular spring leave 101 moves in parallel to the bobbin 103 to the right-hand side, namely, in the direction in which the amount of projection of the magnetic head 7a (7b) increases.

On the other hand, if the direction of the current flowing on the coil 104 is inverted, the bobbin 103 moves to the left-hand side, namely, in the direction in which the amount of projection of the magnetic head 7a (7b) reduces. In this way, by controlling the magnitude and the direction of the current applied to the coil 104, it is possible to control the brake pressure (contact pressure) between the magnetic tape 111 and the magnetic head 7a (7b) which moves in the diametrical direction of the drum composed of the rotary drum 7 and the fixed drum 1.

Since the rotary drum 5 is rotated through the main shaft 3 by the rotational driving force of the drum motor 19, the magnetic heads 7a, 7b are also rotated around the main shaft 3. The magnetic heads 7a, 7b therefore helically scan the magnetic tape 111 which are travelling in the state of being obliquely wound around the rotary drum 5 and the fixed drum 1, thereby excellently reproducing the information recorded on the magnetic tape 111.

In this way, the amount of projection of the magnetic head 7a (7b) at the time of ordinary recording and reproduction is maintained at the optimum value (40 μm) for the surface sliding contact, while when the magnetic tape 111 is stopped in the still operation, pause operation or the like, the amount of projection of the magnetic head 7a (7b) is reduced to about ½ (about 20 μm) so as to reduce the contact pressure between the magnetic head 7 and the magnetic tape 111. Due to this structure, the magnetic head 7a (7b) does not reduce the magnetization power on the magnetic tape 111 or damage the tape surface even in the still or pause operation. Thus, it is possible to maintain such a still or pause operation for a long time, thereby enhancing the operability of the magnetic recording and reproducing apparatus, and to reduce the wear of the magnetic head 7a (7b) caused by the pause operation or the like.

In this embodiment, the two circular spring leaves 101, 102 for supporting the bobbin 103 in such a manner as to float in the axial direction are provided, but the number of the circular spring leaves is not restricted to two and may be three or more. Although a multiplicity of arcuate slits are provided on the circular spring leaf 101 (102) so as to impart the bobbin supporting portion with flexibility in this embodiment, a similar function may be provided by forming radial slits or varying the thickness of the spring leaf 101 (102) with the portion. In short, various springs including springs other than the circular spring leaf may be used so long as they have high elasticity and reliability.

Although the amount of projection of the magnetic head at the time of ordinary recording and reproduction and at the time of stopping the tape (still reproduction, pause) is only explained in this embodiment, it is also possible to set the amount of projection of the magnetic head at a value suitable for slow reproduction (reproduced at an excessively slow tape speed) or high-speed search reproduction (reproduced at about five times as high a speed as the speed for ordinary reproduction).

Furthermore, it is possible to control the amount of projection of the magnetic head in correspondence with the envelope level of a reproducing signal.

Figure 5:
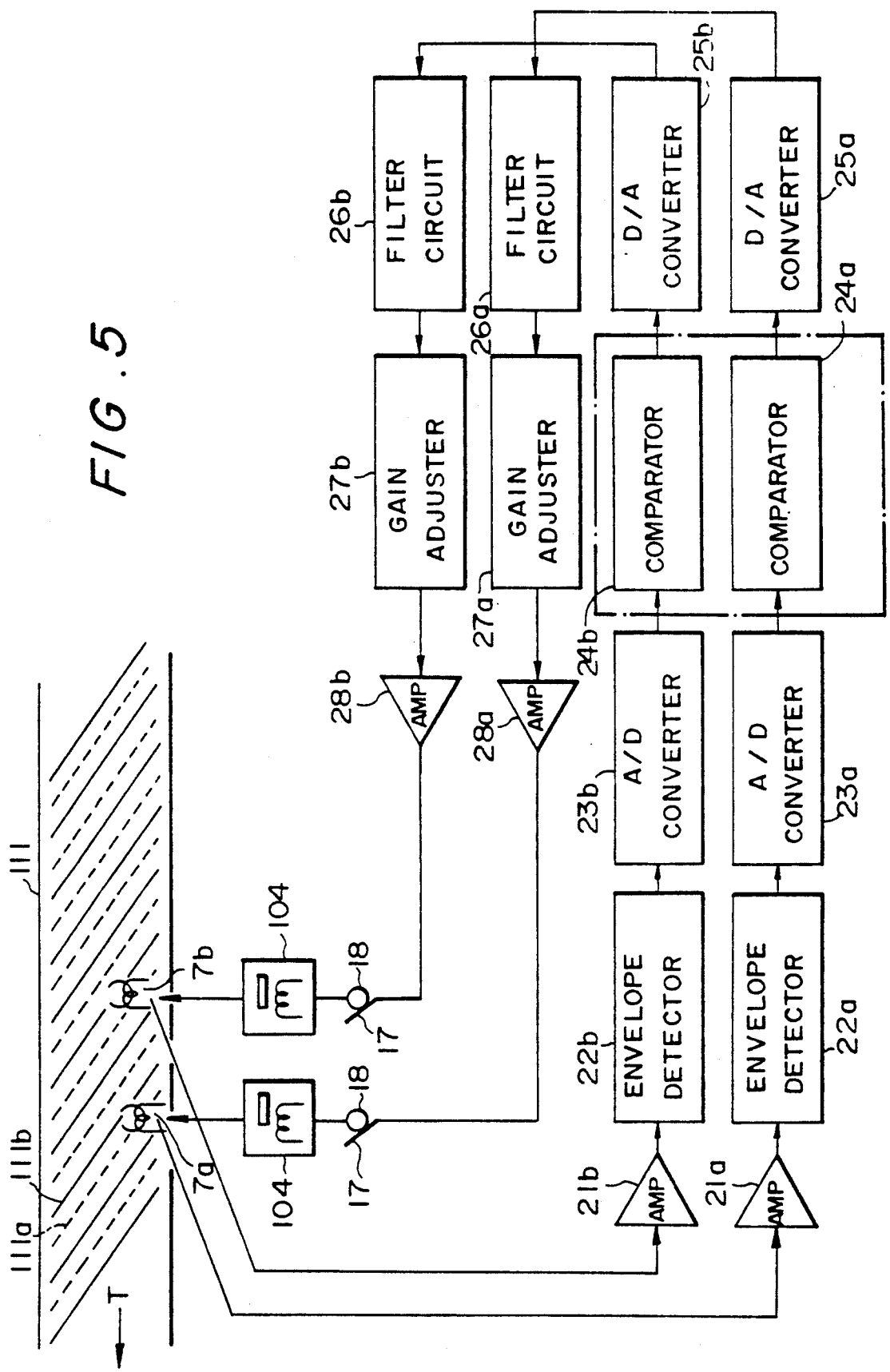
FIG. 5 is a block diagram of the electric system of a rotary magnetic head device according to the present invention.

FIG. 5 is a block diagram of the entire system of the driving portion of such a rotary magnetic head device. In FIG. 5, the reference numeral 111 represents a magnetic tape which travels in the direction indicated by the arrow T, 111a and 111b video tracks at an azimuth of ±6° which are reproduced by the helical scanning by the magnetic heads 7a and 7b, respectively.

The magnetic heads 7a and 7b are connected to amplifiers 21a, 21b, envelope detectors 22a, 22b, A/D converters 23a, 23b, comparators 24a, 24b in a microcomputer, D/A converters 25a, 25b, filter circuits 26a, 26b, gain adjusters 27a, 27b, amplifiers 28a, 28b, each element of the electrode brushes 17, each element of the slip rings 18 and the respective coils 104 in series.

Figure 6A:
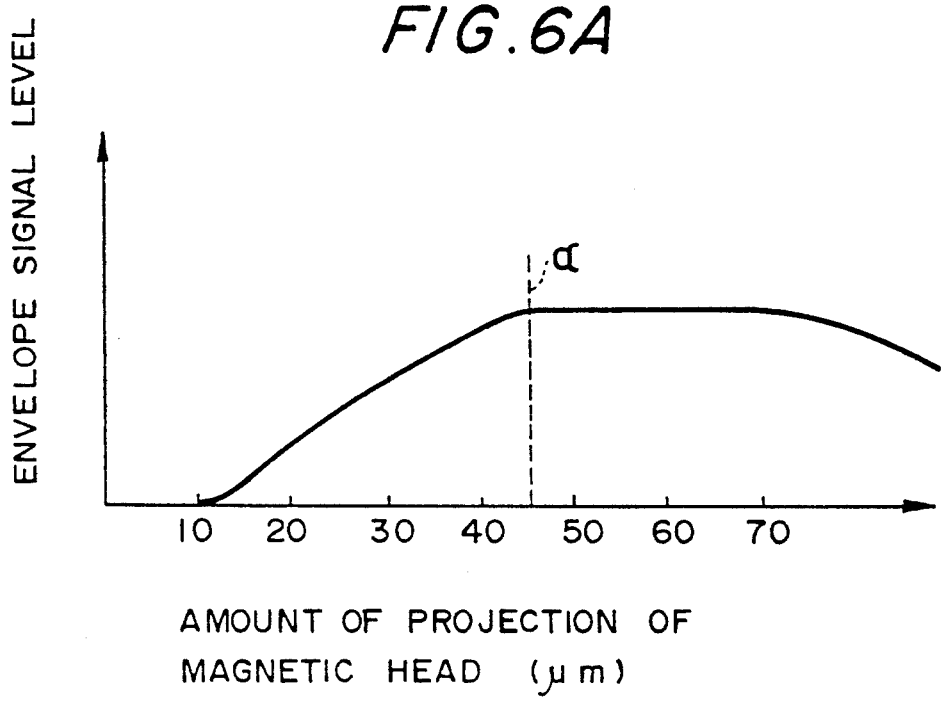
FIG. 6A shows the relationship between the amount of projection a magnetic head and the output of an envelope signal.

The operation of this system will now be explained with reference to FIG. 5. An FM video signal is picked up when the magnetic head 7a traces the video track 111a on the magnetic tape 111, and after the FM video signal is amplified by the amplifier 21a, the envelope of the FM video signal is detected by the envelope detector 22a. The envelope detecting analog signal is input to the A/D converter 23a for converting it into a digital signal, thereby obtaining an envelope digital signal. The relationship between the amount of projection of the magnetic head 7a from the outer peripheral surface of the drum and the output level of the envelope signal at this time is shown in FIG. 6A, wherein the abscissa represents the amount of projection of the magnetic head 7a from the outer peripheral surface of the drum and the ordinate the output level of the envelope signal.

Generally, at the initial stage at which the gap depth of the video head is about 35 μm (in other words, when the video head is new), the gap depth being reduced with the wear of the head, the output of the envelope signal can be detected if the amount of projection is not less than 10 μm. The output level of the envelope signal increases approximately in proportion to the amount of projection, and after it is saturated in the vicinity of the amount of projection of 45 μm, it becomes constant. When the amount of projection signal exceeds 70 μm, the contact pressure between the magnetic head 7a and the magnetic tape 111 becomes excessive, thereby slightly lowering the output level of the envelope signal.

Figure 6B:
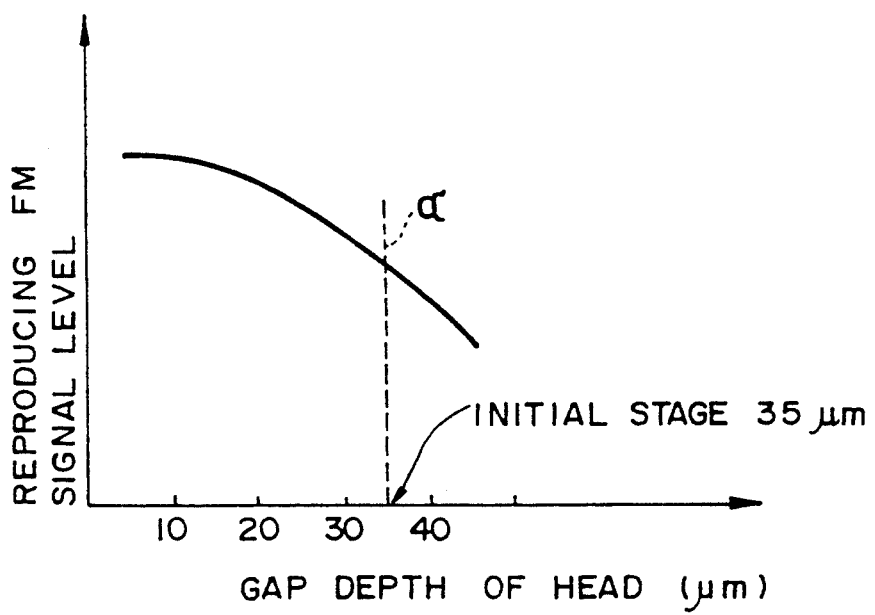
FIG. 6B shows a reproducing FM signal output when the contact pressure between the magnetic tape and the magnetic head is set at the optimum value.
Figure 7:
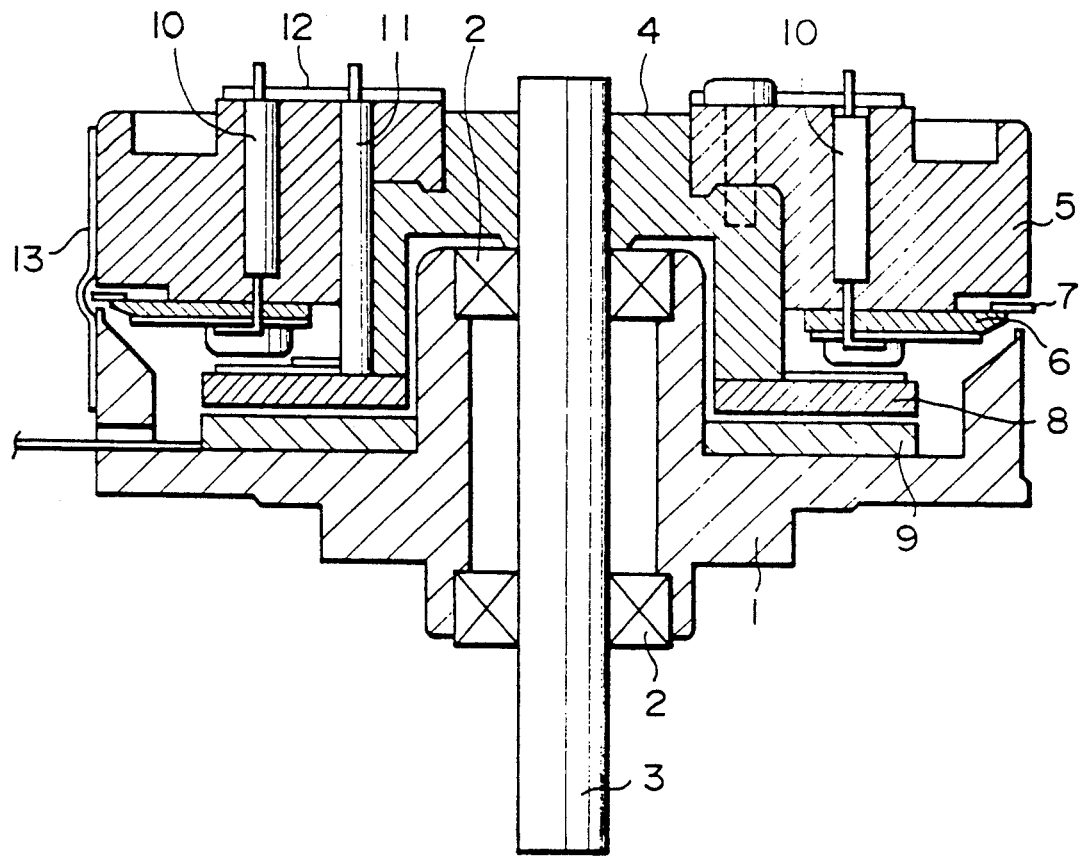
FIG. 7 is a sectional view of a conventional rotary magnetic head device for a magnetic recording and reproducing apparatus.
Figure 8A:
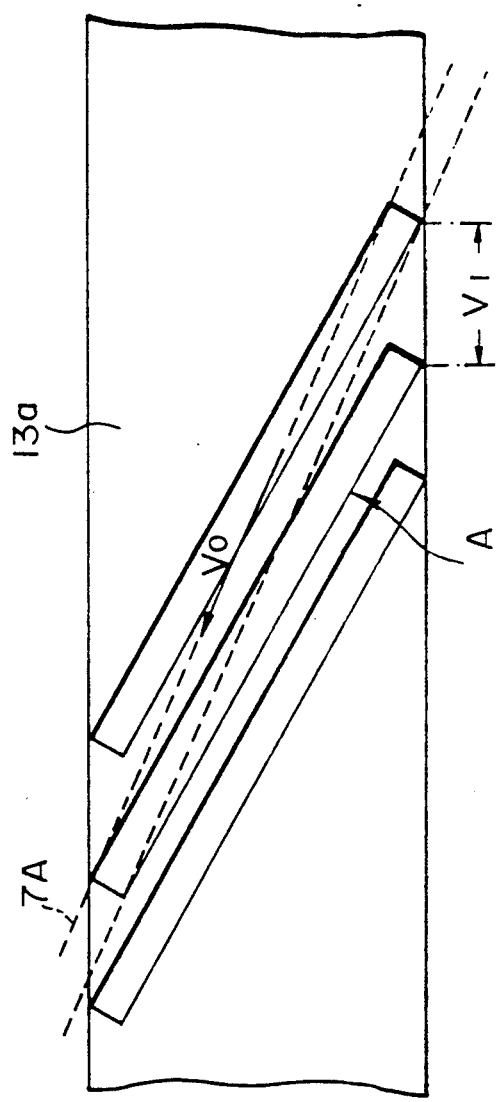
FIGS. 8A and 8B are explanatory views of the relative trajectories of the magnetic tape and the magnetic head in a conventional magnetic recording and reproducing apparatus.
Figure 8B:
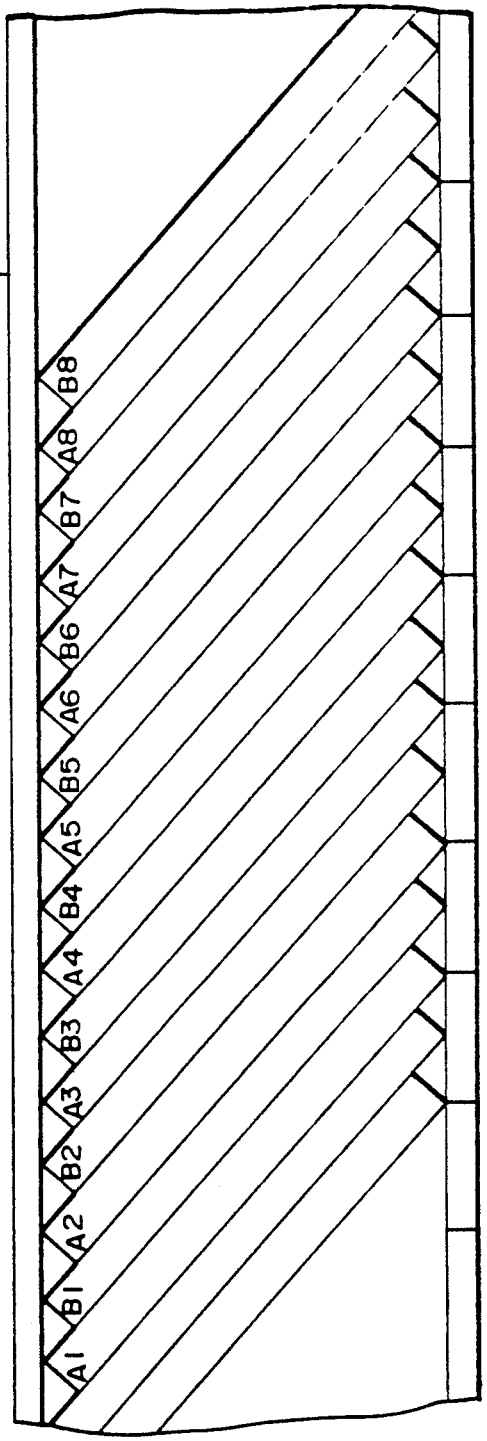
Figure 9:
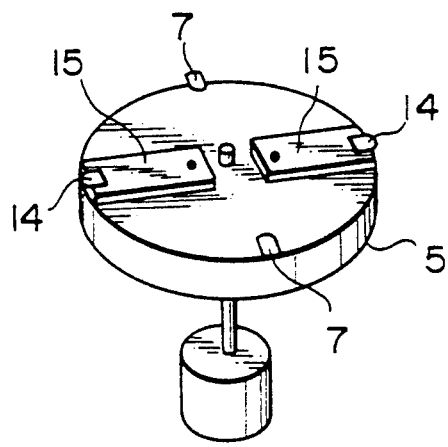
FIG. 9 is a perspective view of a conventional magnetic head device.
Figure 10:
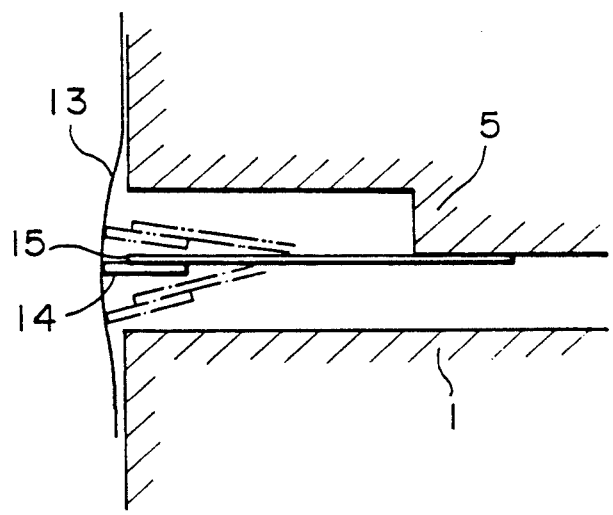
FIG. 10 is an explanatory view of the movement of the magnetic head in a conventional device.
Figure 11:
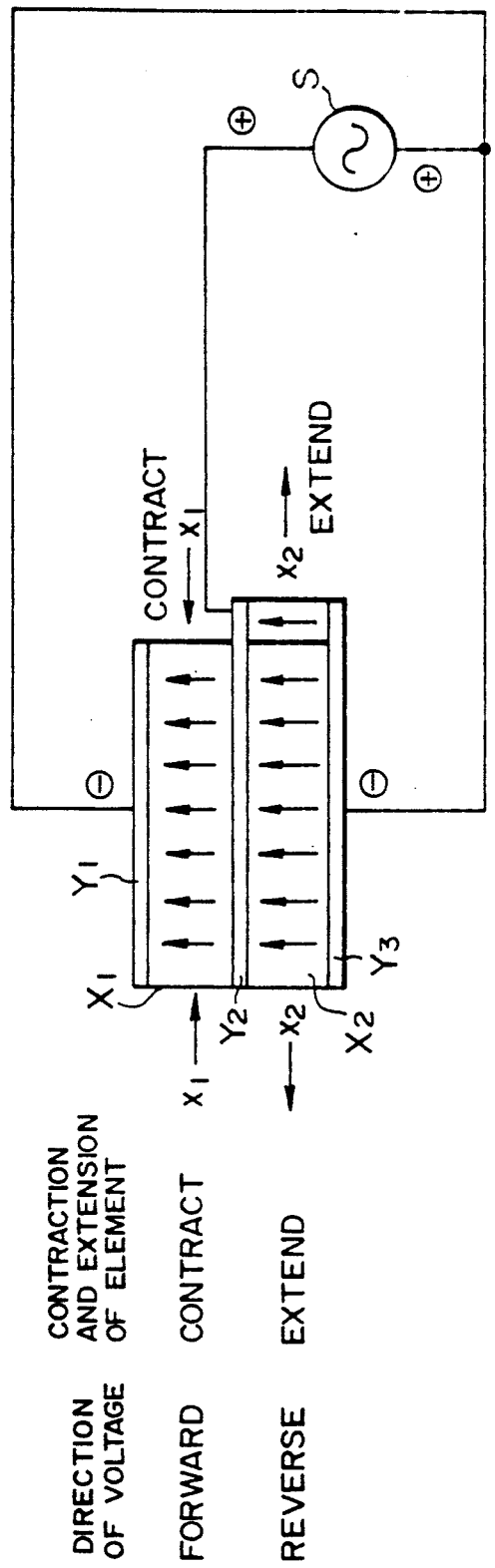
FIG. 11 shows the principle of a bimorph piezoelectric element for moving a magnetic head in a conventional device.
Figure 12:
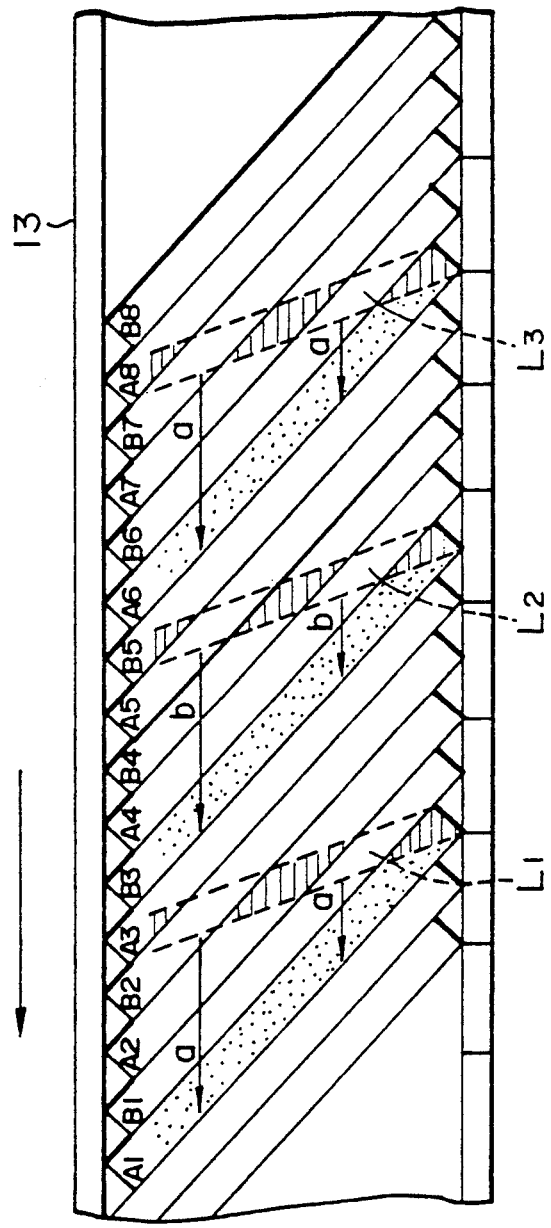
FIG. 12 is an explanatory view for special reproduction from a magnetic tape in a conventional device.

Although it is desirable to set the amount of projection of the magnetic head in the range in which the contact pressure between the tape and the head is the maximum and the output level of the envelope signal is the maximum, the amount of projection of the magnetic head is ordinarily restricted to the minimum (the position indicated by a in FIG. 6A) in the range in which the output level of the envelope signal is the maximum in order to avoid the damage of the magnetic tape or the demagnetization of the magnetic material on the tape caused by the sliding friction between the tape and the head. However, since the head is worn by the sliding motion, the initial value set for the amount of projection of the magnetic head eventually does not satisfy the optimum conditions after continuous use of the apparatus, resulting in the production of a jitter. Thus, the picture quality in an old VTR is deteriorated. When the head is worn, the gap depth is reduced by the depth of wear. When the gap depth of the head is reduced, the magnetic flux for closing the head gap portion concentrates, so that the reproducing efficiency of the head is enhanced and, hence, the reproducing FM signal level increases, as shown in FIG. 6B.

It is therefore necessary to reset the amount of projection of the head at a value suitable for the reproducing FM signal level. In the present invention, the envelope value of the reproducing FM signal is constantly detected and the amount of projection of the head is gradually changed so that it is set at a value suitable for the gap depth and, in addition, the contact pressure between the head and the tape is set at the optimum value.

The digital signal subjected to A/D conversion by the A/D converter 23 shown in FIG. 5 is supplied to the comparator 24a constituted by a microcomputer for the following comparison. The digital signal for slightly searching the amount of projection of the magnetic head 7a by the microcomputer is output to the D/A converter 25a, and the amount of projection of the magnetic head 7a is sequentially varied. The digital signal obtained when the amount of projection of the magnetic head 7a is varied is compared with the digital signal input from the A/D converter 23a before the amount of projection of the magnetic head 7a is varied, and the searching point is restored to the point at which the output level of the envelope signal begins to be saturated (generally, in the vicinity of the amount of projection of 45 μm).

The output signal of the comparator 24a is constantly converted into an analog signal by the D/A converter 25a and smoothed by the filter circuit 26a into a DC voltage signal. The gain of the DC voltage signal is adjusted by the gain adjuster 27a.

The DC voltage signal drives the coil 104 through the current amplifier 28a, the electrode brush 17 and the slip ring 18 so as to control the amount of projection of the magnetic head 7a in the vicinity of 45 μm.

The magnetic head 7b has the same structure as the magnetic head 7a and the operation thereof is also the same, so that explanation thereof will be omitted.

In this way, the amount of projection of the magnetic head 7a (7b) is slowly searched from a lower value and after it is confirmed that the amount of projection has reached the saturation point, the magnetic head 7a (7b) is positioned at the point of the optimum amount of projection at which the output level of the envelope signal begins to be saturated. When there is a difference in the output level of the envelope signal between the magnetic head 7a and the magnetic head 7b, it is desirable that the output levels are corrected by the comparators 24a, 24b constituted by the microcomputer, thereby balancing both channels.

When the gap depth of the head is reduced, the reproducing FM signal level slightly increases, as shown in FIG. 6B, and the picture quality ought to be improved, as described above. However, when the end of the head is worn and the gap depth of the head is reduced by a long-time use, since the amount of projection of the magnetic head is insufficient, the contact pressure between the head and the tape is insufficient, which leads to the increase in the noise caused by the sliding head and the increase in jitter.

To prevent this, according to the present invention, the amount of projection of the magnetic head is constantly sequentially varied by the system shown in FIG. 5, and the envelope is compared with the envelope at the previous stage so as to find the saturation range of the output level of the envelope signal and set the amount of projection at the point at which the output level of the envelope signal begins to be saturated. That is, the amount of projection is set at the minimum in the range in which the output level of the envelope signal reaches the maximum.

In this embodiment, a plurality of circular spring leaves 102 may be provided, but they must be selected from the spring leaves having high elasticity and reliability. Although a multiplicity of arcuate slits are provided on the circular spring leaf 101 (102), the structure is not restricted thereto and a similar function may be provided by forming radial slits or varying the thickness of the spring leaf 101 (102) with the portion.

In the driving system shown in FIG. 5, a technique of converting an envelope signal into a digital signal and searching the digital signal by a microcomputer is adopted, but a technique of controlling an analog signal without conversion may be considered. However, if A/D conversion is adopted as shown in FIG. 5, more circumstantial control is enabled, thereby optimizing the contacting state of the magnetic tape and the magnetic head which is different depending upon the type of the magnetic tape, and the environmental conditions such as the temperature.

In addition, it is possible to compensate for the nonuniformity of the sensitivity in a plurality of magnetic heads by the amount of projection.

As described above, in this embodiment, since the amount of projection of the rotatable magnetic head from the drum is set at the maximum saturation point of the output level of a reproducing FM envelope signal while detecting the amplitude of the FM envelope and at the minimum amount of projection in the saturation range, it is possible to constantly set the amount of projection in the best sliding contact state between the magnetic tape and the magnetic head (the amount of projection of the magnetic head which produces the maximum output of the envelope signal from the magnetic head). In addition, even if the magnetic head is worn by a long-time use, when the gap depth of the head is reduced and there is a possibility of the level of a reproducing FM signal being slightly increasing, it is possible to compensate for the reduction of the amount of projection so as to realize the possibility. Thus, the guarantee for about 5,000-hour use is enabled, while the head must be replaced after 3,000-hour use in a conventional fixed rotary magnetic head. In addition, it is possible to equalize the output levels of the envelope signals of a plurality of magnetic heads by controlling the amounts of projection thereof. Since the amounts of projection of a plurality of magnetic heads become uniform at the initial stage, the beating vibration applied to the magnetic tape is reduced, thereby reproducing a picture of a high quality with a low degree of noise.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A rotary magnetic head device for a magnetic recording and reproducing apparatus comprising:
    a rotary drum;
    a magnetic head projecting outward from said rotary drum in a diametrical direction; and
    head means, coupled to said magnetic head, for varying the projection of said magnetic head outward from said rotary drum by moving said magnetic head in the diametrical direction of said rotary drum, said head means comprising
        a plurality of spring leaves each having a center hole and arranged in parallel to each other with peripheral portions thereof fixed to yokes, and
        bobbin means inserted into the center holes of said plurality of spring leaves, said bobbin means being movably supported by said plurality of spring leaves in the diametrical direction of said rotary drum,
    said magnetic head being operatively coupled to a first of said plurality of spring leaves.

2. The rotary magnetic head device according to claim 1, wherein said head means further comprises:
    a pole piece inserted into said bobbin means;
    permanent magnets disposed at both ends of said pole piece within said bobbin means;
    driving coil means, wound around said bobbin means, for moving said bobbin means in the diametrical direction of said rotary drum by an electromagnetic force produced when energized; and
    a head arm, attached to said first of said plurality of spring leaves and said magnetic head, and extending in the diametrical direction of said rotary drum, for moving said magnetic head in the diametrical direction of said rotary drum in accordance with movement of said bobbin means.

3. The rotary magnetic head device according to claim 1, further comprising:
    envelope detecting means for detecting an envelope of a reproduced signal from said magnetic head;
    searching means, coupled to said envelope detecting means, for obtaining a minimum amount of projection of said magnetic head in a projection range in which a detected envelope level is saturated, by sequentially driving said head means to vary the projection of said magnetic head; and
    control means for controlling said head unit to position said magnetic head at a projection which coincides with said minimum amount of projection obtained by said searching means.

4. The rotary magnetic head device according to claim 3, wherein said searching means comprises:
    A/D converter means, coupled to said envelope detector, for converting said detected envelope into a digital signal; and
    comparator means, coupled to said A/D converter means, for outputting a drive signal for sequentially driving said head means and for sequentially comparing said digital signal with previously generated digital signals to calculate the minimum amount of projection at which the detected envelope level is saturated.

5. The rotary magnetic head device according to claim 4, wherein said control means comprises:
    D/A converter means for converting said drive signal output from said comparator means into an analog signal;
    filter means for smoothing the analog signal output from said D/A converter means into a DC drive signal; and
    amplifier means for amplifying said DC drive signal output from said filter means and for supplying said amplified DC drive signal to said head means.

6. The rotary magnetic head device according to claim 5, wherein said head means further comprises:
    a pole piece inserted into said bobbin means;
    permanent magnets disposed at both ends of said pole piece within said bobbin means;
    driving coil means, wound around said bobbin means, for moving said bobbin means in the diametrical direction of said rotary drum by an electromagnetic force produced when said amplified DC drive signal is applied thereto; and
    a head arm, attached to one of said plurality of spring leaves and said magnetic head, and extending in the diametrical direction of said rotary drum, for moving said magnetic head in the diametrical direction of said rotary drum in accordance with movement of said bobbin means.

7. A magnetic head transport apparatus for varying an outward projection of a magnetic head mounted on a rotary drum, the rotary drum having a fixed lower drum and a rotatable upper drum, the magnetic head projecting outward in a diametrical direction from a gap between the fixed lower drum and the rotatable upper drum, the magnetic head transport apparatus comprising:

yoke housing means mounted on an outer portion of an underside of the rotatable upper drum;

a plurality of spring leaves each having a center hole and peripheral portions fixed to said yoke housing means, said plurality of spring leaves extending into an inner cavity of said yoke housing means and being arranged in parallel to each other;

bobbin means, movably mounted within the center holes and being supported by said plurality of spring leaves, a pole piece with permanent magnets affixed to each end being inserted within said bobbin means;

driving coil means, wound around said bobbin means, for moving said bobbin means by an electromotive force in the diametrical direction upon being energized; and head arm means having opposite first and second ends, said first end being coupled to an end of one of said plurality of spring leaves which extends out through an opening of said yoke housing means, the magnetic head being mounted on said second end, said head arm means being disposed parallel to the diametrical direction to vary the outward projection of the magnetic head through the gap in accordance with movement of said bobbin means.

8. The magnetic head transport apparatus of claim 7, further comprising:

envelope detecting means for detecting an envelope of a signal reproduced by the magnetic head;

searching means, coupled to said envelope detecting means, for obtaining a minimum outward projection of the magnetic head within a projection range in which the detected envelope is saturated, by sequentially driving said head arm means to vary the outward projection of the magnetic head; and control means, coupled to said searching means, for controlling said head arm means to position the magnetic head at an outward projection which coincides with the minimum outward projection obtained by said searching means.

9. The magnetic head transport apparatus of claim 8, wherein said searching means comprises:

A/D converter means, coupled to said envelope detecting means, for converting the detected envelope into a digital signal; and comparator means, coupled to said A/D converter, for outputting a drive signal for sequentially driving the magnetic head and comparing the digital signal with previously generated digital signals to determine the minimum outward projection at which the detected envelope is saturated.

10. The magnetic head transport apparatus of claim 9, wherein said control means comprises:

D/A converter means, coupled to said comparator means, for converting the drive signal into an analog signal;

filter means, coupled to said D/A converter means, for smoothing the analog signal into a DC drive signal; and amplifier means, coupled to said filter means, for amplifying the DC drive signal and for supplying the amplified DC drive signal to said driving coil means.

11. A rotary magnetic head device for a magnetic recording and reproducing apparatus comprising:

a rotary drum having at least one magnetic head rotatably mounted thereon;

radial translation means, mounted within said rotary drum, for varying an outward projection of said at least one magnetic head in a radial direction of an axis of rotation of said rotary drum; and control means for generating a detected envelope of a reproduced signal from said at least one magnetic head and for driving said radial translational means to position said at least one magnetic head to an optimum outward projection by continuously varying the outward projection of said at least one magnetic head within a predetermined projection range, the optimum outward projection being a minimum projection in which said detected envelope saturates.

12. The rotary magnetic head device of claim 11 wherein said control means comprises:

envelope detecting means, coupled to said at least one magnetic head, for generating said detected envelope of said reproduced signal; and searching means, coupled to said envelope detecting means, for generating control signals to position said at least one magnetic head in accordance with said detected envelope.

13. The rotary magnetic head device of claim 11, wherein said radial translation means comprises:

a plurality of spring leaves each having a center hole and arranged in parallel to each other with peripheral portions thereof fixed to yokes; and bobbin means inserted into the center holes of said plurality of spring leaves, said bobbin means being movable supported by said plurality of spring leaves in the radial direction of said rotary drum, said at least one magnetic head being operatively coupled to a first of said plurality of spring leaves.

14. The rotary magnetic head device of claim 13, wherein said radial translation means further comprises:

a pole piece inserted into said bobbin means;

permanent magnets disposed at both ends of said pole piece within said bobbin means;

driving coil means, wound around said bobbin means, for moving said bobbin means in the radial direction of said rotary drum by an electromagnetic force produced when energized; and a head arm, attached to said first of said plurality of spring leaves and said at least one magnetic head, and extending in the radial direction of said rotary drum, for moving said at least one magnetic head in the radial direction of said rotary drum in accordance with movement of said bobbin means.

15. In a system having at least one magnetic head rotatably mounted on a rotary drum, a method of positioning the magnetic head to an optimum outward projection in a radial direction of an axis of rotation of the rotary drum, the magnetic head being mounted on radial translation means within the rotary drum, the method comprising the steps of:

detecting an envelope of a reproduced signal output from the magnetic head;

sequentially varying an outward projection of the magnetic head over a predetermined range;

comparing detected envelopes of the sequential outward projections of the magnetic head to determine the optimum outward projection of the magnetic head, which is a minimum outward projection at which the detected envelopes saturate; and moving the radial translation means to position the magnetic head to the optimum outward projection.

16. The method of positioning the magnetic head of claim 15, wherein said step of sequentially varying an outward projection and said step of moving the radial translation means comprises generating drive signals for driving the radial translation means over the predetermined range.

17. The method of positioning the magnetic head of claim 16, wherein the drive signals are digital and the method comprises the further steps of:

converting the digital drive signals into analog signals;

filtering the analog signals into DC drive signals; and amplifying the DC drive signals, the amplified DC drive signals thereafter being used to drive the radial translation means.

18. The method of positioning the magnetic head of claim 17, further comprising the step of digitally converting the detected envelopes prior to said step of comparing.

* * * * *